United States Patent
Raulin et al.

(10) Patent No.: US 7,671,484 B2
(45) Date of Patent: Mar. 2, 2010

(54) DEVICE FOR CONTROLLING POWER TRANSFER BETWEEN TWO CORES OF A DIRECT CURRENT NETWORK

(75) Inventors: Loic Raulin, Plaisance du Touch (FR); Hubert Piquet, Garrigues (FR); Xavier Roboam, Colomiers (FR); Henri Foch, Toulouse (FR); Jeremi Regnier, Toulouse (FR)

(73) Assignees: Airbus France, Toulouse (FR); Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 12/090,510

(22) PCT Filed: Oct. 27, 2006

(86) PCT No.: PCT/EP2006/067853
§ 371 (c)(1),
(2), (4) Date: Apr. 17, 2008

(87) PCT Pub. No.: WO2007/048837
PCT Pub. Date: May 3, 2007

(65) Prior Publication Data
US 2008/0284248 A1    Nov. 20, 2008

(30) Foreign Application Priority Data
Oct. 27, 2005    (FR) .................................. 05 53269

(51) Int. Cl.
*H02J 1/10* (2006.01)
*H02M 3/158* (2006.01)
(52) U.S. Cl. ......................................... 307/20; 307/19

(58) Field of Classification Search ............. 307/19–22; 363/98
See application file for complete search history.

(56) References Cited

U.S. PATENT DOCUMENTS

| 4,600,984 | A | | 7/1986 | Cohen |
| 5,734,258 | A | * | 3/1998 | Esser .......................... 323/224 |
| 2002/0145898 | A1 | * | 10/2002 | Kataoka et al. ................ 363/98 |
| 2005/0047039 | A1 | * | 3/2005 | Rajashekara et al. .......... 361/62 |

FOREIGN PATENT DOCUMENTS

| EP | 1 248 345 | 10/2002 |
| EP | 1 511 149 | 3/2005 |

OTHER PUBLICATIONS

Caricchi, F. et al., "20 kW Water-Cooled Prototype Of A Buck-Boost Bidirecetional DC-DC Converter Topology for Electrical Vehicle Motor Drives", IEEE, pp. 887-892 (1995).
U.S. Appl. No. 12/090,486, filed Apr. 17, 2008, Raulin, et al.

* cited by examiner

*Primary Examiner*—Fritz M Fleming
(74) *Attorney, Agent, or Firm*—Oblon, Spivak, McClelland, Maier & Neustadt, L.L.P.

(57) ABSTRACT

A device for controlling power transfer between two cores of a direct current network, in which the cores, which are source-charge interconnection nodes, include protective and contact members, placed in different areas of a power distribution system in which the direct current network is installed. The device includes an electronic power converter including two switching cells mutually interconnected by an inductance, wherein each switching cell includes two switches, and a module for controlling the converter, which ensures both a controllable direct current power transfer and stabilization of the direct current voltage.

5 Claims, 3 Drawing Sheets

DEVICE FOR CONTROLLING POWER TRANSFER BETWEEN TWO CORES OF A DIRECT CURRENT NETWORK

TECHNICAL FIELD

This invention relates to a device for controlling the power transfer between two cores of a direct current network.

The field of the invention is in particular that of direct current networks on board an aircraft. However, the device of the invention can also be used with any type of on-board networks (naval, motor vehicle, etc.), and even networks not on board, for example in the field of stationary applications corresponding to a stationary network (direct current local network, railroad, etc.).

To keep the description simple, we will limit it to the on-board aeronautical field.

In the remainder of the description, the terms "continuous networks" and "direct current networks" have the same meaning and can therefore be used interchangeably.

PRIOR ART

The benefit of transferring energy by direct current connections in on-board networks is primarily due to the development of power electronics, in particular due to the increase in the number of on-board electromechanical actuators, on board airplanes. Most of these actuators, controlled and powered with static converters, indeed require the presence of a direct current voltage stage. However, such a stage is obtained from a conventional alternating current network using an alternating-direct current conversion.

It is possible to replace all of the conversion units thus used with a centralized direct voltage power distribution: this distribution can be a total direct distribution (high-voltage direct current or HVDC network) or a partial direct distribution (mixed alternating-direct current network).

However, the implementation of such direct current networks presents new technical problems, in consideration in particular of the need to ensure the stability of these networks regardless of the type of charge supplied.

To obtain a sufficient voltage quality for each equipment item connected to such a direct current network and to filter the harmonics generated by this equipment, it is possible to use a filter, such as an LC-type filter (L: inductance; C: capacitance) placed at the input of the equipment. In the current direct current networks, the charges connected are often controlled by power and control electronics, which absorb, at the scale of the cut-off frequency of the filter, a near-constant power. Such a phenomenon is even more notable insofar as the regulation of the connected equipment is dynamically efficient. However, the input filter, placed between the direct current power supply and the regulated static converter, is then capable of breaking into oscillation upon a powerful impact. The higher the L/C ratio is, which is especially the case when the equipment is connected over a long cable length, the greater the voltage oscillations at the terminals of the filter capacitance.

The document referenced [1] at the end of the description thus demonstrates that any system consisting of a filter charged by a static converter, which absorbs a constant power on the scale of the dynamics of the filter, is a potentially unstable system.

The architectures of the current alternating current networks consist of connecting all of the equipments to a single centralized "core" via lines, which can be very long, and thus have significant impedance.

A "core" is a source-charge interconnection node including protective and contact members, of which the voltage (in this case, direct current) is stabilized by an external element. A core can be connected to an energy source: alternator+ rectifier group ("connected core"). It can also be connected only to a power source (storage member) or very simply to one or more other cores ("non-connected core").

In consideration of the potential instability phenomena mentioned above, the propensity when very long cables are used to increase this phenomenon, it is therefore neither sufficient nor prudent to model the architecture of direct current networks on that of alternating current networks.

The documents referenced [2] and [3] describe two solutions of the prior art intended to reduce the risks of instability.

The first of these two documents describes a power distribution system on board an airplane, in the context of the MEA ("More Electric Aircraft") initiative. Most of the charges, including actuators, are regulated by using bidirectional power converters, which control and condition the power on the basis of a direct current bus. The loss of stability in the event of significant disturbances is analyzed in this document in order to demonstrate the usefulness of a nonlinear stability analysis method. This document attempts to establish stability criteria for small variations around a given point of operation and as well as in consideration of high-amplitude variations. This document demonstrates the difficulty of ensuring the stability of the system through the choice of the parameters of its constituents (impedance of interconnected elements, bandwidths and limitations of control components), in the context of a direct voltage energy distribution structure.

The second of these two documents describes an active direct current bus conditioner for a distributed power system, which compensates the harmonic and reactive current on a direct current bus and actively attenuates the oscillations in the direct current power system. This document also relates to direct current voltage power distribution and proposes the implementation of equipment intended to improve the quality of the voltage distributed over a single bus by attenuating the fluctuations of the current that the energy sources must supply.

The context of these two documents is the distribution of energy by means of a direct current voltage bus. The design of the network and its equipment in order to ensure the stability of the system is difficult, and its control is always limited.

The invention is intended to reduce these risks of instability by interfacing, between two cores, placed in different areas of the system in which the network is installed, and therefore separated by significant distances, power and control electronics capable of controlling power transfers between these cores, while ensuring the quality and availability of this power in normal mode as well as in degraded mode (loss of a source, excessive power on a core, etc.).

DESCRIPTION OF THE INVENTION

The invention relates to a device for controlling power transfer between two cores of a direct current network, in which said cores, which are source-charge interconnection nodes, include protective and contact members, placed in different areas of a power distribution system in which the direct current network is installed, characterized in that it includes:

an electronic power converter comprised of two switching cells mutually interconnected by an inductance, wherein each switching cell consists of two switches, a module for controlling said converter, which ensures both a controllable direct current power transfer and stabilization of the direct current voltage.

Advantageously, each switching cell consists of two switches unidirectional in voltage and bidirectional in current. Each switch can include a transistor associated with a diode in an anti-parallel structure. The inductance can include a physical component if the inductance specific to the cable connecting the cores is insufficient.

The device of the invention has the following advantages.

It makes it possible to design mesh network architectures with decentralized cores, and to ensure the stability of these networks by minimizing the cable lengths between the stabilized voltage nodes (cores) and the equipment, even when there are destabilizing charges absorbing a near-constant power.

In normal mode, it performs a controllable power transfer between two cores, making it possible to distribute and balance the power fluxes of the network(s). The stability of the current is ensured by a current-controlled connection, even if the cable lengths between cores are long and meshes capable of oscillating are present. The core connection/disconnection modes are therefore stable and smooth.

In normal mode, it can act as a "voltage stabilizer" of a core not connected to a direct current network.

In degraded mode (for example, when a source is lost), it can act as a "voltage stabilizer" of the core connected to a default source after disconnection of the core from said source.

DETAILED DESCRIPTION OF SPECIFIC EMBODIMENTS

Figure 1:
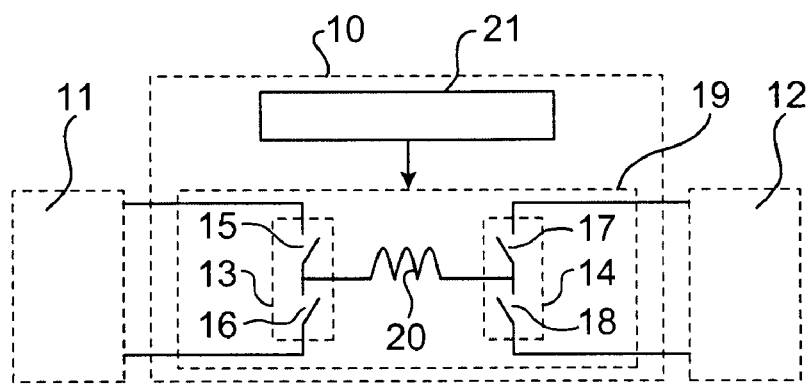
FIG. 1 shows a diagrammatic representation of the device of the invention.

FIG. 1 shows a diagrammatic representation of the device of the invention 10 located between two cores, or nodes, 11 and 12 of a direct current network, which includes:

an electronic power converter 19 comprised of two switching cells 13 and 14 mutually interconnected by an inductance 20, which can consist of the line inductance if the value thereof is sufficient or by a physical component, and each connected to a core; each switching cell consists of two switches (15, 16; 17, 18), unidirectional in voltage and bidirectional in current, for example a transistor associated with a diode in an anti-parallel structure, a module 21 for controlling said converter so as to ensure both a controllable direct current power transfer and stabilization of the direct current voltage of the cores 11 and 12.

Figure 4:
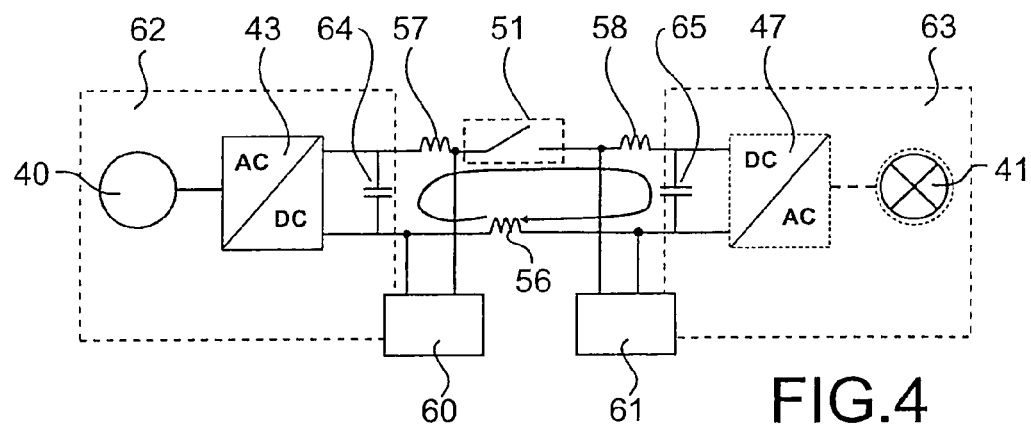
FIG. 4 shows a breakdown of an alternator in a structure of the prior art connected by a contactor.

The control of the two switching cells 13 and 14 enables the near-instantaneous control of the current on the line connecting the two cores 11 and 12, with response times on the order of several switching periods of associated cells in the device of the invention (typically several milliseconds). This control makes it possible to:

establish a regulation of the power transfer between the two cores in a normal operation mode, as well as in the event of a malfunction on the generator associated with one of them, in which this power transfer can take place indifferently from one of the two cores to the other;

regulate and balance the powers supplied by the generators that power the cores;

facilitate the electrical disconnection of the cores, because the control of the two switching cells makes it possible to cancel the current in the inductive branch of the device of the invention before turning off a contactor placed, as in FIG. 4, on the cable that connects the cores 62 and 63 (FIG. 4);

help to ensure, with a suitable control of the two switching cells of the device of the invention, the stability of the voltage supplied at the level of the cores.

FIG. 1 also shows a diagrammatic representation of the device of the invention, which includes a voltage-current connection 13 connected to a current-voltage connection 14 by means of the inductance 20. The first module 13 regulates the power transfer (i.e. the direct current at a given voltage). The second module 14 stabilizes the direct current voltage of the core not connected or of the core connected, the source of which would have just malfunctioned (degraded mode).

The device of the invention thus performs two functions. It simultaneously enables:

an adjustable direct current power transfer, and control and stabilization of the direct current voltage.

The device of the invention is more specifically oriented toward the management and control of energy exchanges between two decentralized cores, which have a fundamental "voltage source" property (at least instantaneously), which can be confirmed by a set of capacitors is necessary.

Figure 2:
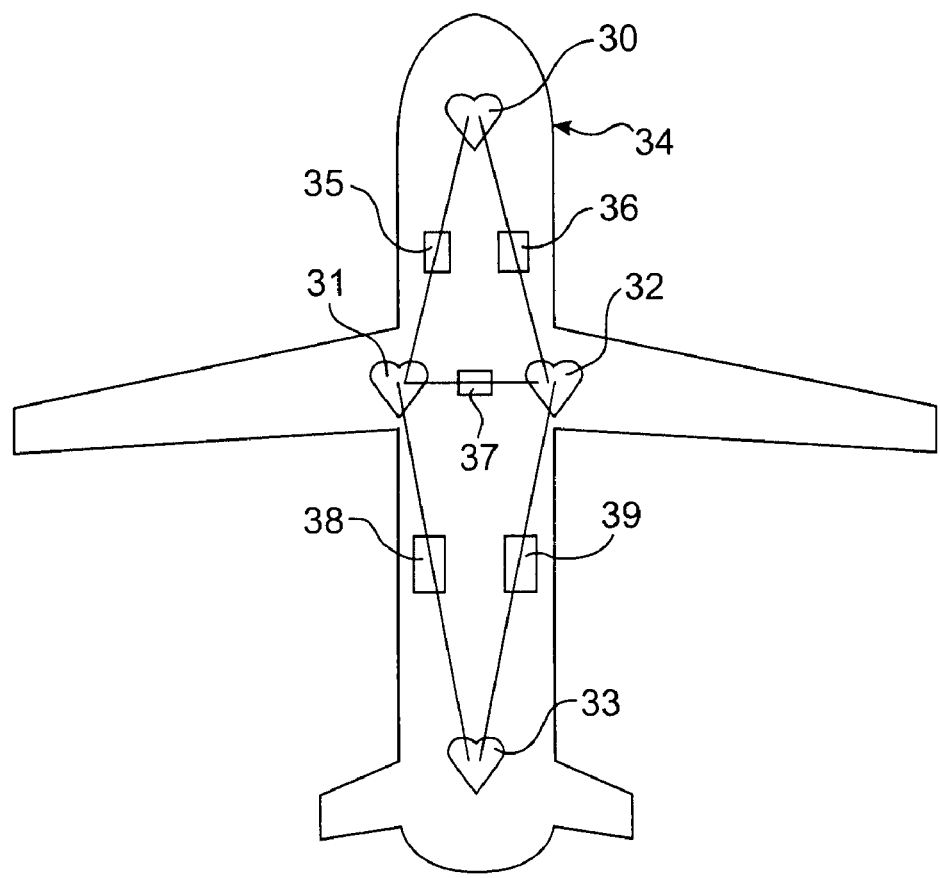
FIG. 2 shows an on-board architecture with a decentralized core according to the invention.

FIG. 2 thus shows an architecture, on board an airplane 34, with decentralized cores 30, 31, 32 and 33, in which a plurality of devices according to the invention 35, 36, 37, 38 and 39 are respectively arranged between two adjacent cores.

We will now consider each of the two functions of the device of the invention.

Adjustable Power Transfer

The device of the invention makes it possible to equally distribute the power consumed by network users over the alternators.

Figure 3:
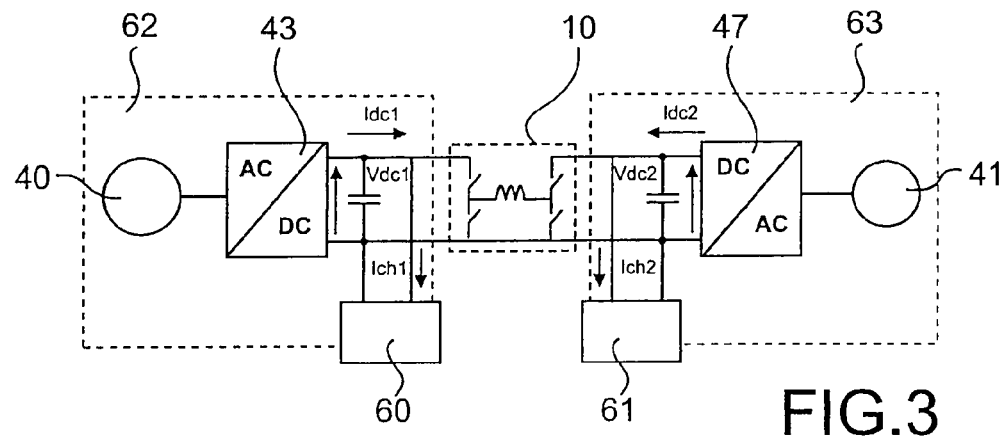
FIG. 3 shows an example embodiment of the device of the invention.

FIG. 3 thus shows the distribution of power consumed between two alternators 40 and 41.

The first alternator 40 is connected to a first bus bar (first core) 62 via a first stabilized alternating-direct current rectifier module 43. A first charge 60 is connected to this first bus bar 62.

The second alternator 41 is connected to a second bus bar (second core) 63 via a second stabilized alternating-direct current rectifier module 47. A second charge 61 is connected to this second bus bar 63.

The device of the invention 10, which is arranged between the two bus bars 62 and 63, makes it possible to balance the powers supplied by the two alternators 40 and 41. When a charge variation occurs on one of the cores 62, 63, the alternator with the lowest charge supplies, via the device of the invention 10, a portion of the power necessary for powering the charges 60 and 61.

In normal operation, the power to be distributed over the alternators 40 and 41 can thus be calculated according to the total sum of the consuming elements, and no longer the sum of the consuming elements connected to a single isolated alternator. The point of operation of these alternators 40 and 41 can thus be imposed and controlled. The device of the invention 10 acts as an electronic "valve" capable of regulating the power transfers, even in the presence of variations in the voltage of the direct current source that powers it.

It is also possible to simplify the structure of the alternators 40 and 41 by suppressing the regulation of the voltage that they supply.

Control and Stabilization of Voltage

The device of the invention 10 makes it possible to power an unconnected core from a connected core, or to manage the reconfiguration of the network in the event of a breakdown of one or more sources.

The device of the invention, in the event of a breakdown of one of the alternators, makes it possible to transfer power to the part of the network located on the side of the malfunctioning alternator and to control the transient and oscillating phenomena that may occur.

To demonstrate the benefit of the device of the invention, we will consider a solution of the prior art (FIG. 4) followed by the solution of the invention (FIG. 5) in the event of a breakdown of one of the alternators.

FIG. 4 shows the case of a breakdown of the second alternator 41 on a structure of the prior art connected by a contactor 51. References 56, 57 and 58 respectively designate the line and wiring inductances. The recovery of the power supply by means of the contactor 51 causes a step voltage to be applied in a mesh comprising inductances (line inductances) and capacitances (capacitance of the PWM (Pulse Width Modulation) rectifier, for example) capable of oscillating. The current in the contactor 51 is then entirely free to evolve and no control is possible. The quality of the voltage supplied to the charges 60 and 61 cannot be ensured by the network. New constraints must therefore be taken into account in the design of equipment.

Assemblies 62 and 63, comprised of the association of an alternator 40 or 41, an AC/DC voltage generation converter 43 or 47 and a capacitor 64 and 65 placed at the output (DC side) of the converter correspond to the notion of the "network core", i.e. the point of the network where the voltage is controlled.

Such an energy supply solution is merely one example: this power supply can also be obtained directly with a direct current using direct current generating equipment (direct current machine, photovoltaic panel, etc.).

The equipment 60 and 61 is connected to the network cores 62 and 63 constituting the charge. The cores in the prior art are distributed in the network structure. The distance between the core and the equipment necessarily results in the presence of a wiring inductance. Each equipment item 60 and 61 is equipped with an input filter, not shown in FIG. 4, conventionally comprised of at least one inductance-capacitance cell. This filter makes it possible to satisfy the requirements of limiting harmonic disturbances in the current absorbed by the equipment and of protecting the input stage of the equipment from any variation in the voltage available at its connection point.

Some equipment comprises a static converter having a "constant power charge" behavior. The association of this converter and of its input filters leads to instability, which can be solved by an adapted control or the addition of additional passive components. However, the stabilization thus obtained can be uncertain due to the presence of wiring inductances 56, 57 and 58.

In a "normal" mode of operation, each core independently powers the equipment connected to it and the two cores do not exchange power. The contactor 51 is in the "off" position.

In the event of a malfunction of one of the alternators, to ensure the continuity of the power supply to the equipment connected to it, the defective core is isolated, then the contactor 51 is placed in the "on" position. The objective is thus to transfer electrical power 66 over a large distance (for example, several dozen meters) through lines that have a significant inductance 56. In the transient mode corresponding to the change to the on state of the contactor 51, all of the reactive elements (the capacitances 64 and 65, the wiring inductances 57 and 58, the line inductance 56 and the input filters of the equipment) are the site of oscillations that are very difficult to control, and that are capable of damaging the input stages of the connected equipments.

Figure 5:
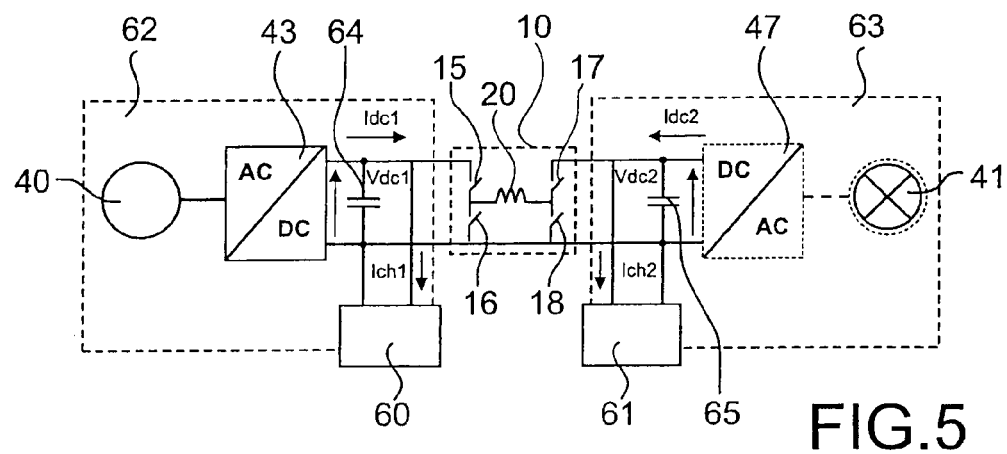
FIG. 5 shows a breakdown of an alternator in a structure connected by the device of the invention.

FIG. 5 shows the same case of a breakdown of the second alternator 41 on a structure connected by the device of the invention. The transfer of energy to the charges deprived of a power supply is then controlled. It is possible to prevent all of the oscillation phenomena mentioned above. The control of the current via the device of the invention also makes it possible to control the sizing constraints of the contactors possibly implemented in order to ensure the possibilities of segregation and isolation of a malfunction. The handling of such contactors (placed in series on the inductance of the device of the invention) can be performed under zero current (opening) or zero charge (closure).

The equipment 60, 61 that forms the charge of each of the cores 62, 63 is connected directly to these cores, so as to minimize the wiring inductances, which are no longer shown in FIG. 5.

Example Embodiment

Figure 6A:
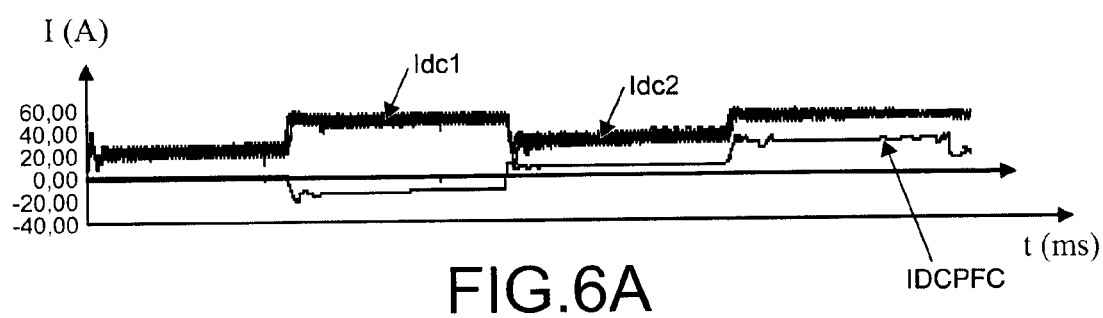
FIGS. 6A and 6B show time charts obtained with the example embodiment of FIG. 5.
Figure 6B:
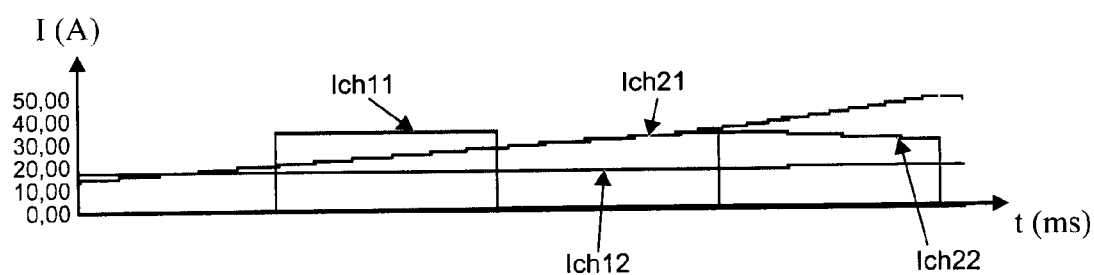

As shown in FIG. 6B, the two cores 62 and 63 of FIG. 5 are charged differently, and the role assigned to the device of the invention 10 is that of balancing the currents delivered by the two alternators 40 and 41.

The core 62 is charged by a charge 60 that absorbs a current comprising two components shown in FIG. 6B: a pulsed component (Ich11) and a constant component (Ich12). The core 63 is charged by a charge 61 that absorbs a current comprising two components: a slowly increasing component (Ich21) and a pulsed component (Ich22).

As shown in FIG. 6A, the time chart makes it possible to assess the perfect balance obtained at the level of the currents delivered by each core (Idc1 and Idc2); it is also possible to view the current (IDCPFC) circulating in the inductance of the device of the invention.

In these FIGS. 6A and 6B, the duration of the simulated scenario is 100 ms. The duration of the various events and their concomitance are not necessarily realistic. The scenario is intended to qualitatively establish the ability of the proposed structure to handle various situations presented by this scenario.

REFERENCES

[1] "Méthode d'étude de la stabilité des ensembles convertisseurs-filtres" by Philippe Barrade, Hubert Piquet, and Yvon Cheron (Journal de Physique III, vol. 6, pages 91 to 104, January 1996)

[2] "Subsystem interaction analysis in power distribution system of next generation air-lifters" by Sriram Chandrasekaran, Douglas K. Lindner, Konstantin Louganshi, and Dushan Boroyevich (European Power Electronics Conference, Lausanne, Switzerland, 7-9 September 1999, pages 1-6)

[3] "An active bus conditioner for a distributed power system" by Kun Xing, Jinghong Guo, Wenkang Huang, Dengming Peng, Fred C. Lee and Dusan Borojevic (Power Electronics Specialists Conference, pages 895-900, 1999 PESC 99. 30$^{th}$ Annual IEEE)

The invention claimed is:

1. A device for controlling power transfer between at least a first core and a second core of a direct current network, in which the first and second cores, which are source-charge interconnection nodes, include protective and contact members and each of the first and second cores includes an alternator, the first and second cores being placed in different areas of a power distribution system in which the direct current network is installed, the device comprising:
   an electronic power converter comprising a first switching cell and a second switching cell mutually interconnected by an inductance, wherein each switching cell comprises two switches, and the first switching cell is configured to receive a direct current input from the first core, and the second switching cell is configured to receive a direct current input from the second core; and
   a module for controlling the converter, which ensures both a controllable direct current power transfer and stabilization of a direct current voltage,
   wherein when the alternator of the second core is defective, the first core is charged by a charging unit which absorbs a current comprising a pulsed component and a constant component, and the second core is charged by a charging unit which absorbs a current comprising a slowly increasing component and a pulsed component, and the module for controlling the converter is configured to control the first switching cell and the second switching cell to balance each of the direct current inputs from the first core and the second core.

2. A device according to claim 1, wherein each switching cell comprises two switches unidirectional in voltage and bidirectional in current.

3. A device according to claim 1, wherein the inductance comprises a physical component.

4. An airplane comprising:
   at least a first core and a second core of a direct current network, in which the first and second cores, which are source-charge interconnection nodes, include protective and contact members and each of the first and second cores includes an alternator, the first and second cores being placed in different areas of a power distribution system in which the direct current network is installed; and
   a device according to claim 1.

5. A power distribution system comprising:
   at least a first core and a second core of a direct current network, in which the first and second cores, which are source-charge interconnection nodes, include protective and contact members and each of the first and second cores includes an alternator, the first and second cores being placed in different areas of the power distribution system; and
   a device for controlling power transfer between the at least first core and second core, the device including
      an electronic power converter comprising a first switching cell and a second switching cell mutually interconnected by an inductance, wherein each switching cell comprises two switches, and the first switching cell is configured to receive a direct current input from the first core, and the second switching cell is configured to receive a direct current input from the second core; and
      a module for controlling the converter, which ensures both a controllable direct current power transfer and stabilization of a direct current voltage,
   wherein when the alternator of the second core is defective, the first core is charged by a charging unit which absorbs a current comprising a pulsed component and a constant component, and the second core is charged by a charging unit which absorbs a current comprising a slowly increasing component and a pulsed component, and the module for controlling the converter is configured to control the first switching cell and the second switching cell to balance each of the direct current inputs from the first core and the second core.

* * * * *